United States Patent [19]

Fukushima et al.

[11] 4,338,554

[45] Jul. 6, 1982

[54] AUTOMATIC GAIN CONTROL APPARATUS FOR A MOTOR SERVO SYSTEM

[75] Inventors: Isao Fukushima; Hideo Nishijima, both of Katsuta; Kenji Satoh, Yokohama; Tunehiko Teshima, Katsuta, all of Japan

[73] Assignee: Hitachi, Ltd., Tokyo, Japan

[21] Appl. No.: 143,120

[22] Filed: Apr. 23, 1980

[30] Foreign Application Priority Data

Apr. 27, 1979 [JP] Japan .................................. 54-51508

[51] Int. Cl.³ .............................................. H02D 5/16
[52] U.S. Cl. .................................... 318/328; 318/341; 318/327
[58] Field of Search .............. 323/22 T; 312/326, 327, 312/328, 391

[56] References Cited

U.S. PATENT DOCUMENTS 3,361,949  1/1968  Brown et al. ........................ 318/314
3,524,125  8/1970  Berger et al. ...................... 323/22 T
3,629,677  12/1971  Means ................................. 318/327

Primary Examiner—David Smith, Jr.
Attorney, Agent, or Firm—Craig & Antonelli

[57] ABSTRACT

When the number of revolutions of a motor, or a motor speed is reduced half, a gain of a frequency-voltage converter is doubled. By taking advantage of this fact, a gain of an error signal amplifier disposed at the poststage of the frequency-voltage converter is automatically changed to be half interlocking with a switching operation for switching the number of the motor revolutions to the half.

8 Claims, 7 Drawing Figures

AUTOMATIC GAIN CONTROL APPARATUS FOR A MOTOR SERVO SYSTEM

BACKGROUND OF THE INVENTION

1. Field of the Invention

The present invention relates to an automatic gain control apparatus for a motor servo system.

2. Description of the Prior Art

In FIG. 1 illustrating a block diagram of a conventional motor speed control circuit, 1 designates a frequency-voltage converter; 2 an error voltage amplifier; 3 a motor; 4 a motor speed detector for producing a sinusoidal or pulsate signal proportional to the number of revolution or a motor speed; 5 a reference power source; 17 an amplifier; 19 a pulse generator. In FIG. 1, the motor speed detector fetches a signal with a frequency corresponding to the motor speed of the motor 3. The fetched signal is converted into a DC voltage by the frequency-voltage converter 1. The converted DC voltage is compared with a reference voltage of the reference power source 5 by the error voltage amplifier 2. By controlling the drive voltage of the motor 3 by a voltage in accordance with an error, the motor speed control circuit operates so as to minimize the difference between the voltages of the reference power source and the frequency-voltage converter 1. For setting the motor speed to a desired value, it may be selected to change the gain of the frequency-voltage converter 1 or to change the voltage of the reference power source 5. It is a common practice, however, that the gain of the frequency-voltage converter as shown in FIG. 2 is changed for this purpose. It is assumed that to an input terminal 6 is applied a signal proportional to the motor speed, namely, a pulse as shown in FIG. 3(a). This pulse drives a reset switch 12, a pulse shown in FIG. 3(b) delayed by a given amount of delay $\tau$ by a delay circuit 7 drives a sampling switch 11, a pulse as shown in FIG. 3(c) delayed by the given amount of delay $\tau$ by another delay circuit 8 drives a reset switch 10. With such a construction, a capacitor 13 is charged by a constant current Io from a constant current source 9 for a given period of time and is instantaneously discharged by the reset switch 10. The cycle of the charge and the instantaneous discharge to and from the capacitor is repeated to produce a signal with a triangular waveform as shown in FIG. 3(d). In order to sample-and-hold the peak value of the triangular wave in a capacitor 14, the sampling switch 11 is operated by the output from the delay circuit 7 immediately before the reset switch 10 is operated. The voltage across the capacitor 14 must be reset for each period to obtain the hold voltage which is always proportional to the motor speed in accordance with a change of the motor speed. To this end, the pulse shown in FIG. 3(a) is used to reset a reset switch 12. Through the operation as mentioned above, the waveform of the voltage across the capacitor 14 becomes as shown in FIG. 3(e). If the pulse width of each pulse (a) to (c) in FIG. 3 is satisfactorily shorter than a repetitive period T, a voltage substantially equal to the peak value shown in FIG. 3(d) may be obtained at the output terminal 16 by making the voltage across the hold capacitor pass through a low-pass filter 15.

The peak voltage V across the capacitor 13 is given by the following equation $$V = Io/C \times T = Io/C \times 1/f \quad (1)$$

where Io is the current from the constant current source 9, C is a capacitance of the capacitor 13, T is a repetitive period, and f is the frequency. The circuit shown in FIG. 1 operates so that the peak voltage V is approximately equal to the reference voltage Vr across the reference voltage source 5. In this circuit, a set period Tr may be changed by changing the reference voltage Vr or the constant current Io. In this case, it is preferable to use the constant current Io for changing the set period Tr. The reason for this is that a changeable range of the voltage Vr is restrictive for the reason of the limited power source voltage. From the equation (1), the gain K of the frequency-voltage converter is given $$K = dV/df = -Io/C \times 1/f^2 \quad (2)$$

Hence, with respect to the gain K1 at the frequency $f_o$, a gain Kn at a frequency $nf_o$ obtained when the current Io is increased by n times, is expressed by $$Kn = dv/dt_{f=nf_o} = -NIo/C \times 1/(nf_o)^2 = K1/n \quad (3)$$

As seen from the above equation, the gain becomes small proportionally to the motor speed. In other words, when the motor speed is small, the gain is large, while when it is large, the gain is small. In the usual motor servo system, where there is a single set frequency, the above-mentioned phenomena does not give rise to any problem. In the case where an apparatus has many set frequencies, such as a video tape recorder in which a capstan motor speed is set to 1/n, double, constant, or n times speeds, the gain must be substantially constant by changing the gain of the error voltage amplifier; otherwise, the servo system tends toward oscillation or provides insufficient system drive, failing to obtain a desired control characteristic. Most of the conventional motors have been designed to have a single set frequency. Therefore, all a designer has to do is to merely change the circuit constant of the error voltage amplifier in accordance with the kind of the motor used. In the case where a number of set motor speeds, i.e. set frequencies, are assigned to a single motor within a circuit, it is difficult to change the gain of the error voltage amplifier 2 by merely changing the constant of the reference power source 5 for each frequency. When the circuits shown in FIGS. 1 and 2 are fabricated by an IC technology, it is impossible to change the circuit constants in the IC circuits fabricated. For determining the gain in such IC circuits, many additional components are attached to the IC substrate, together with their associated circuits to switch the components. This makes the circuit construction complicated. In this respect, it is uneconomical.

SUMMARY OF THE INVENTION

Accordingly, an object of the invention is to provide an apparatus automatically change the gain of a servo system for a motor in accordance with motor speed which is once set, with the view of eliminating the defects of the prior art.

A major feature of the invention resides in that a change of gain of the servo system produced when a plurality of motor speeds are set, by a signal applied from outside the system, is automatically corrected or offset by changing the gain of an amplifier disposed at the output of a frequency-voltage converter in a servo system for a motor.

DETAILED DESCRIPTION OF THE PREFERRED EMBODIMENTS

Figure 1:
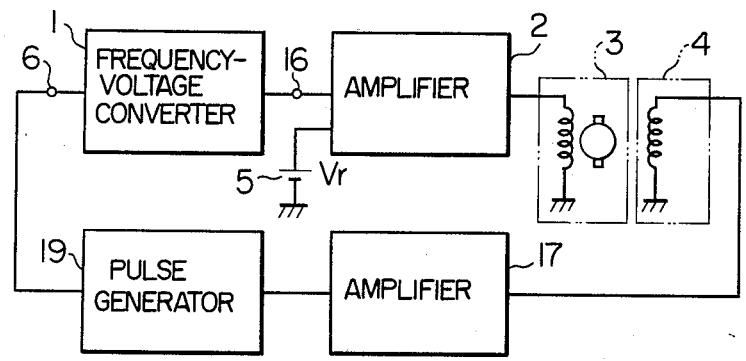
FIG. 1 is a block diagram of illustrating a conventional motor speed control circuit.
Figure 2:
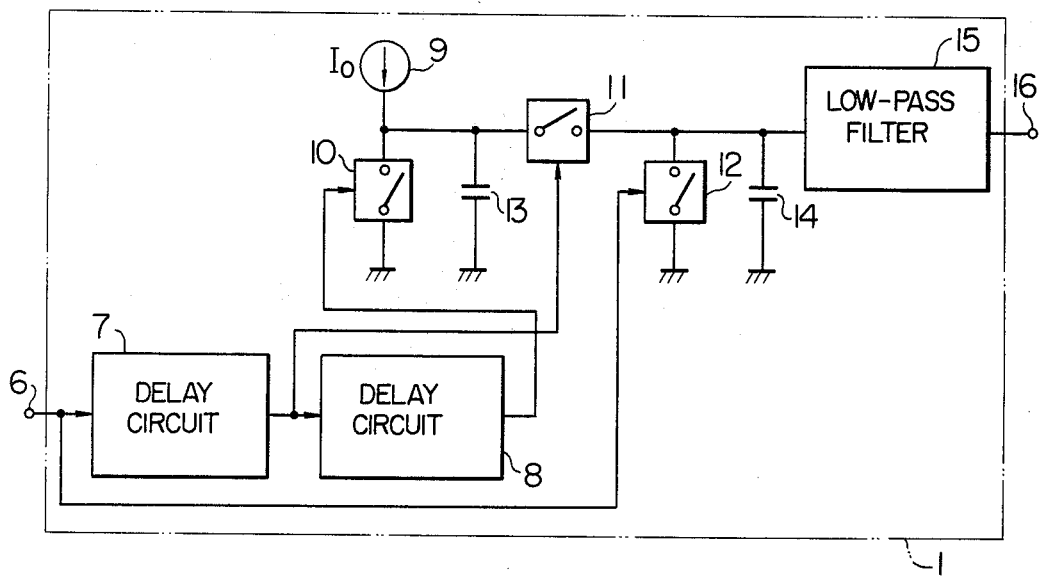
FIG. 2 is a block diagram of a frequency-voltage converter used in the motor speed control circuit shown in FIG. 1.
Figure 3:
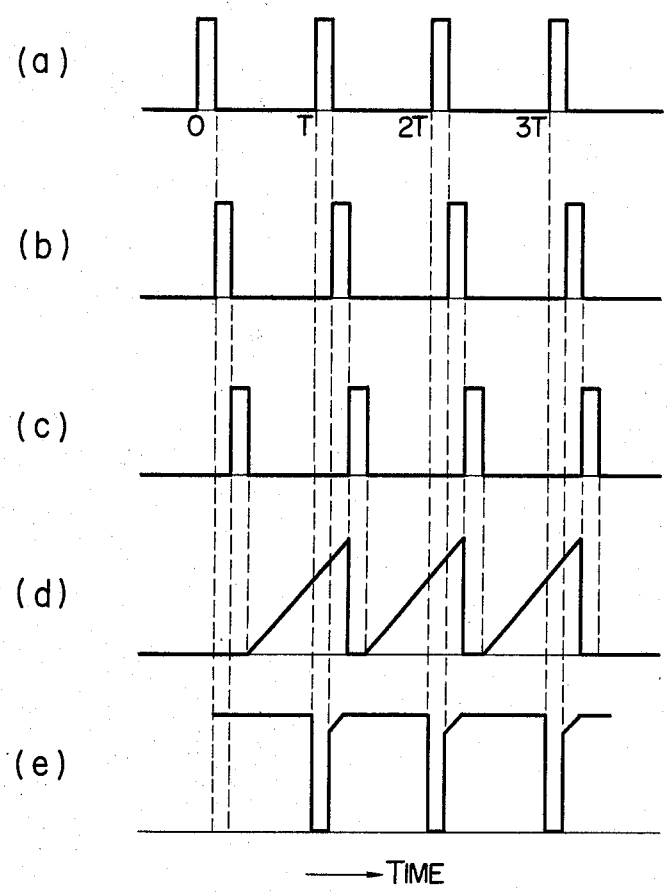
FIGS. 3(a) to 3(e) are a set of waveforms useful in explaining the operation of the circuit shown in FIG. 2.
Figure 5:
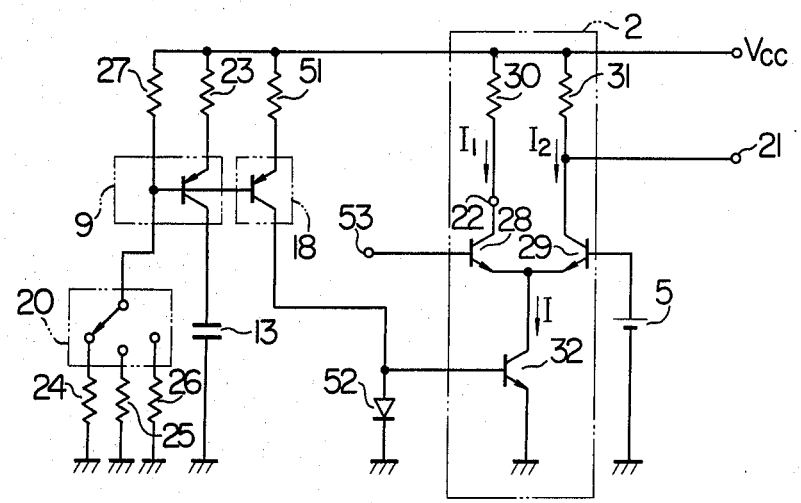
FIG. 5 is a circuit diagram of essential part of the detailed embodiment according to the invention.
Figure 4:
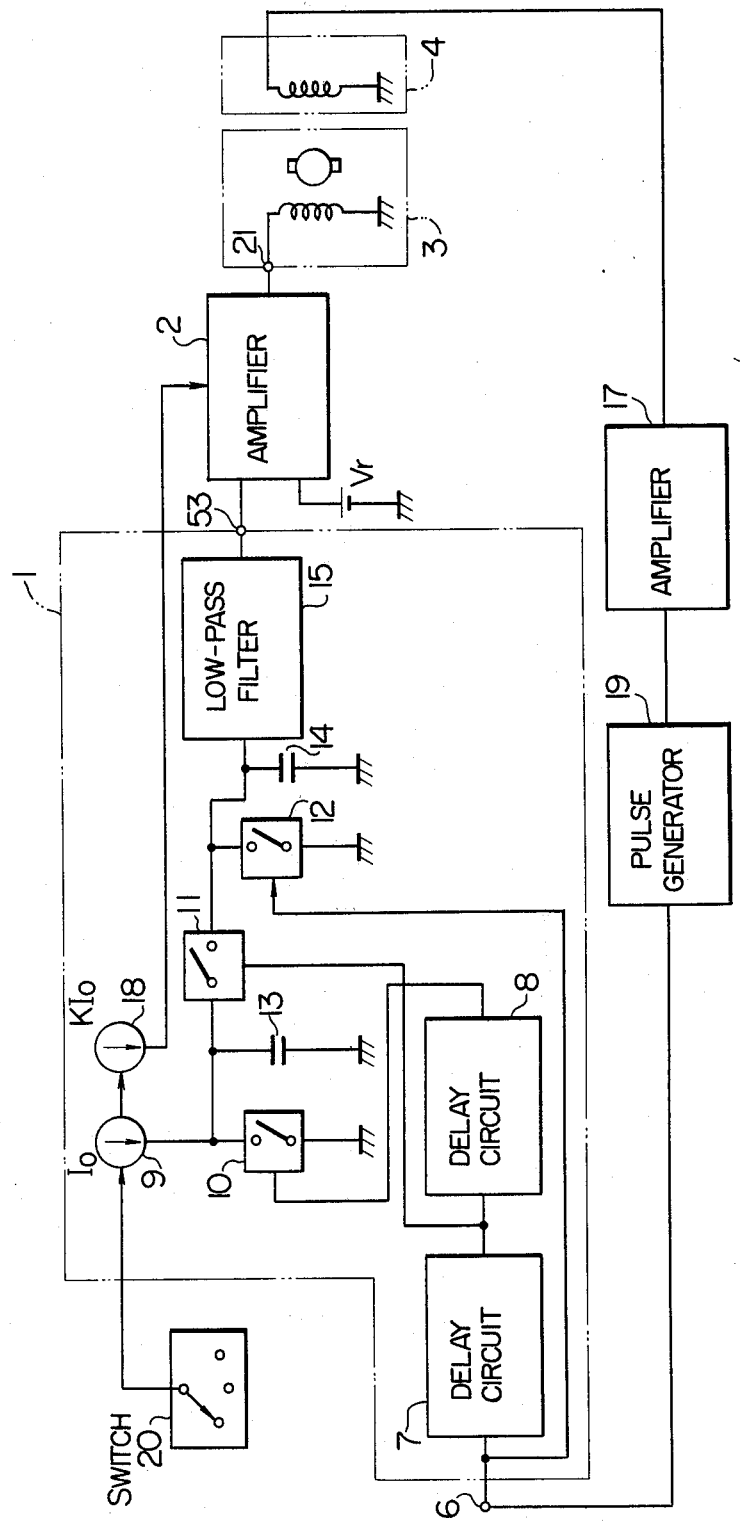
FIG. 4 is a block diagram of an embodiment of an automatic gain control circuit according to the present invention.

FIG. 4 illustrates the principle of a motor speed control circuit according to the present invention. In the figure, like reference symbols are used for designating portions with like functions in FIGS. 1 and 2. As described above, in the frequency-voltage converter with the circuit construction shown in FIG. 2, as the set motor speed of the motor 3 becomes large, or the set frequency becomes large through the switching of the switch 20, the gain of the converter becomes smaller, as described by the equation (3). For correcting this, the motor speed control circuit according to the invention changes the gain of the error voltage amplifier 2. To this end, provided is a constant current source 18 in the form of a transistor, for example, for producing a signal proportional to the current from the constant current source 9, and the gain of the error voltage amplifier 2 is changed in a manner that switching of the switch 20 changes the current from the constant current source 9 to change the above-mentioned current. FIG. 5 illustrates a circuit diagram of a detailed embodiment for changing the gain of the error voltage amplifier in accordance with a change of the current from the constant current source 9. Reference numerals 9 and 18 are constant current sources constituted by NPN transistors, respectively. Resistors 23 and 24 are used to make constant the ratio of the constant current of the constant current source transistor 18 to the current of the constant current transistor 9. The switch 20 switches the resistors 24 to 26 to change amounts of the constant currents of the transistors 9 and 18 determined by the combination of one of the three resistors with a resistor 27 in accordance with a set motor speed. Reference numeral 2 in FIG. 5 designates a differential amplifier of the known constant current attraction type which compares the output signal from the frequency-voltage converter 1 in FIG. 1 applied to a terminal 53 thereof with a voltage from a reference power source 5, thereby to produce an error signal proportional to the difference. The differential amplifier 2 serves as the error voltage amplifier. Assuming that the amount of current flowing through a transistor 32 as a constant current source of the differential amplifier 2 is designated by I and the differential voltages applied to both the bases of a pair of differential transistors 28 and 29 is designated by V, the currents $I_1$ and $I_2$ flowing through the differential transistors 28 and 29 are given by equations (4) and (5), as well known, $$I_1 = \frac{I}{1 + \exp \frac{-qV}{kT}} \quad (4)$$

$$I_2 = \frac{I}{1 + \exp \frac{qV}{kT}} \quad (5)$$

where q is an amount of charge of an electron, k is Boltzmann's constant, and T is an absolute temperature. For $V = 0V$, mutual conductances gm1 and gm2 are $$gm1 = \frac{2I_1}{2V} \bigg|_{V=0} = \frac{I}{4} \cdot \frac{q}{kT} \quad (6)$$

$$gm2 = \frac{2I_2}{2V} \bigg|_{V=0} = \frac{-I}{4} \cdot \frac{q}{kT} \quad (7)$$

Therefore, a differential amplification G between the terminals 21-22 for the resistances R of resistors 30 and 31 is expressed by $$G = (gm1 - gm2) R = \frac{I}{2} \cdot \frac{q}{kT}$$

As seen from the above equation, the differential amplification G is proportional to the constant current I. From this fact that the gain of the differential amplifier changes proportional to the constant current, it could be deduced that a change of the gain expressed by the equation (3) may be corrected by taking advantage of the fact. That is to say, the correction of the gain change may be realized in a manner that when the set motor speed is high, the constant current is increased, while when it is low, the constant current is decreased.

More specifically, with provision of the constant current source transistor 18 for feeding the constant current proportional to the current flowing through the constant current source transistor 9, as shown in FIG. 5, a current proportional to the current flows into a constant current source transistor 32. In the circuit of FIG. 5, the resistors 24 to 26 corresponds to double speed, standard speed and half speed, respectively. Further, the resistances of those resistors are related to one another with a ratio of ½:1:2. The switch 20 selects one of those resistors. As shown, the switch 20 is connected through the resistor 27 to the power source Vcc. The constant current source transistor 9 is connected at the base to the connection point between the switch 20 and the resistor 27, at the emitter to the power source Vcc via the resistor 23, and at the collector to the capacitor 13 which is the same as those in FIGS. 2 and 4. The constant current transistor 18 is coupled with the constant current transistor 9 in the known current Miller fashion. The transistor 18 is connected at the base to the base of the transistor 9, at the emitter to the power source Vcc via the resistor 51, and at the collector to the anode of a diode 52.

In operation, for setting the motor speed to half speed, the switch 20 is switched to the resistor 26. Since resistance of the resistor 26 doubles that of the resistor 25, so that the current flowing through the constant current source transistor 9 is reduced by half and the current flowing through the constant current source transistor 18 also is reduced by half. At this time, the constant current I of the transistor 32 and thus the gain of the differential amplifier 2 are also reduced half. To double the motor speed of the motor, the switch 20 is switched to the resistor 24 side, so that the gain of the amplifier 2 is doubled through a reverse operation to the above-mentioned one. As will be understood from the above description, even if the switch 20 is switched with respect to the resistors 24 to 26 to change the set motor speed, the gain of the servo system including the motor may be made substantially constant, so that the servo system may be controlled stably without oscillation.

Similar effects are attainable by a modification of the above-mentioned circuit in which the diode is replaced by a resistor and a resistor is inserted in the emitter circuit of the constant current transistor 32. Alternatively, use of a variable resistor in place of the combination of resistors 24, 25 and 26, enables the switch 20 to continuously change the set motor speed being attendant with a stable operation.

Figure 6:
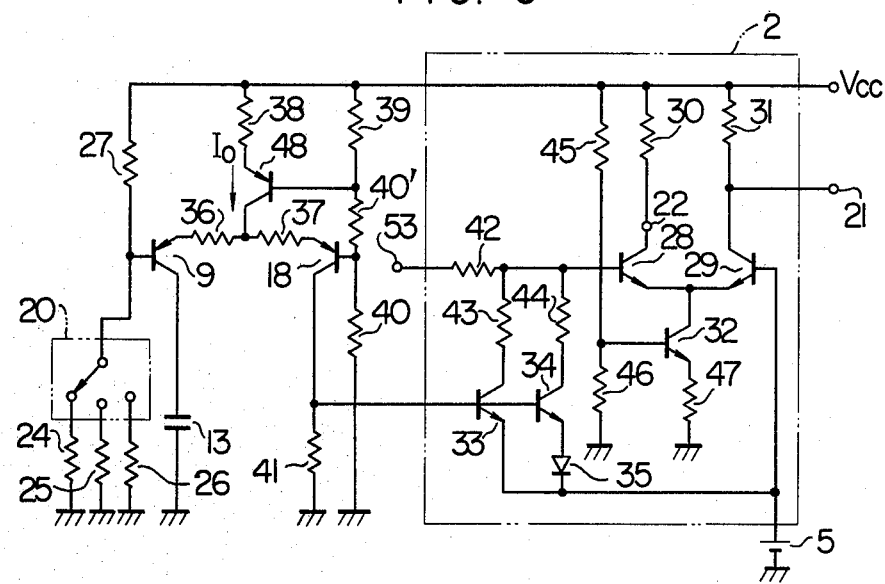
FIG. 6 is a circuit diagram of essential part of another embodiment of the automatic gain control circuit according to the invention.

FIG. 6 is another embodiment of the circuitry to change the gain of the error voltage amplifier 2 in accordance with the constant current source 9. In the figure, like reference symbols are used to designate portions with like functions in FIG. 5. The embodiment of FIG. 6 employs the combination of a differential amplifier with a constant current, or a constant gain, determined by resistors 45 to 47, and an electronic switch connected to the prestage of the amplifier, for the error voltage amplifier, which is constituted by the differential amplifier with a variable gain in the embodiment shown in FIG. 5. With such a construction of the error voltage amplifier, the output level from the frequency to voltage (f-v) converter applied may be changed in accordance with the motor speed. In the electronic switch, resistors 42 to 44 are used to properly render switching transistors 33 and 34 conductive thereby to divide the output voltage from the frequency to voltage converter. The constant current source transistors 9 and 18 are combined with a constant current source transistor 48 and the resistors 27, and 36 to 41 thereby to form a differential amplifier. A constant current Io is determined by the resistors 38 to 40. The resistors 39 and 40 provide a bias value for one of the differential transistors 9 and 18, while the combination of the resistor 27 and any one of the resistors 24 to 26 provide another bias value for the other differential transistor and sets up a voltage to shunt the constant current Io to the constant current transistor 9 or 18. The resistances of those resistors 24 to 25 are selected such that the resistance of the resistor 24 is small, that of the resistor 25 is medium and that of the resistor 26 is large. The resistors 36 and 37 are used to enlarge a dynamic range for a difference voltage between the pair of the differential amplifiers. An input dynamic range of the differential amplifier is ±100 mV, as known. Accordingly, if the difference voltage may accurately be set up within this range, the resistors 36 and 37 are not necessary. With such a construction, when the switch 20 selects the resistor 24, the constant current transistor 9 has the maximum current and accordingly the motor rotates at the top of its speed. When the resistors 25 and 26 are successively selected, the set motor speeds become low gradually. When the resistor 24 is selected, the differential effect makes little current flow through the constant current transistor 18, so that no voltage is developed across the resistor 41, and the switching transistors 33 and 34 are in cut-off state. For this reason, the output signal from the f-v converter inputted into the input terminal 53 is not divided and is directly applied to the base of the transistor 28 of the differential amplifier. Then, the switch 20 selects the resistor 25 in order to set the motor speed to the medium, the constant current Io shunts into also the constant current transistor 18, so that a voltage is developed across the resistor 41. If the voltage developed is so selected that it is above the sum of the voltage Vr of the reference power source 5 and the base-emitter voltage $V_{BE}$, i.e. $(Vr+V_{BE})$, but it is below the sum of the voltage Vr, the base-emitter voltage $V_{BE}$ of the transistor 34 and the forward voltage $V_F$ across the diode 35, i.e. $(Vr+V_{BE}+V_F)$, only the transistor 33 is conductive perfectly, and the output signal from the f-v converter inputted into the terminal 53 is divided by the resistors 42 and 43, so that the gain of the output signal between the terminals 21 and 22 with respect to the signal at the terminal 53 is reduced. Then, when the switch 20 selects the maximum resistor 26, a slight amount of current Io flows into the capacitor 13 while most of the current flows into the resistor 41. Therefore, a relatively long time is taken for charging the capacitor 13, so that the motor speed is set to a further slower speed. The voltage developed across the resistor 41 may be selected above the sum $(Vr+V_{BE}+V_F)$. In this case, both transistors 33 and 34 are conductive perfectly, so that the output signal from the f-v converter inputted to the terminal 20 is divided by the parallel connected resistors 43 and 44, and the resistor 43, with the result that the gain is further reduced. If only the resistance value is selected properly, amount of the attenuation of the gain may also be properly selected and therefore it may be changed proportionally corresponding to the number of revolutions of the motor. The reason why the emitter of the transistor 33 and the cathode of the diode 35 are connected to the reference power source 5 is that for any number of revolutions of the motor, the output signal from the f-v converter is substantially equal to the voltage from the reference voltage source 5 to voltage-divide only the changed component of the voltage.

If the power source voltage has full scope of its value, the grounding of the emitter of the transistor 33 and the cathode of the diode 35 causes no problem. When the number of the motor speeds more than three employed in the above-mentioned embodiment is used, all one has to do is increase the numbers of the voltage-dividing resistors and the transistor switches correspondingly. Similar effects to the above are ensured.

Figure 7:
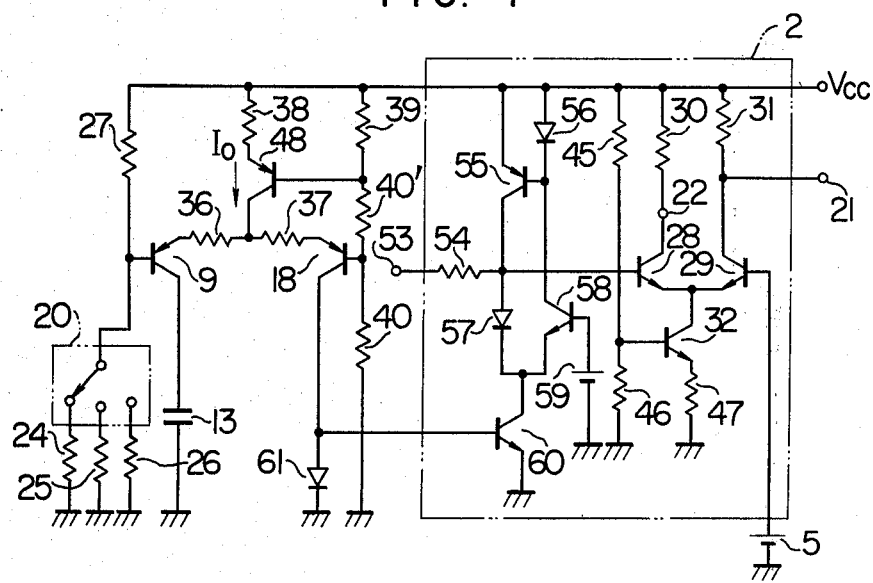
FIG. 7 is a circuit diagram of essential part of still another embodiment of the control circuit according to the invention.

FIG. 7 shows still another embodiment of the invention, in which like reference symbols designate portions with like functions in FIG. 6. The error voltage amplifier 2, which is constituted by the electronic switch and the differential amplifier in FIG. 5, employs a known Dolby circuit, i.e. a variable gain amplifier, for the electronic switch. When the switch 20 selects the resistor 26, the constant current of the transistor 18 increases and with this the internal impedance of the transistor 60 reduces and the internal impedance $r_e$ of a diode 57 becomes small. Accordingly, the output signal from the f-v converter is divided by a resistor and the diode 57 and the divided voltage is applied to the differential amplifier 28. When the switch 20 is switched, the constant current of the transistor 18 reduces. At this time, the internal impedance $r_e$ of the diode 57 becomes large, so that the ratio of the voltage dividing changes to the divided voltage decreases.

When the embodiment of the invention is fabricated into an IC circuit, those components and their interconnections of the frequency-voltage converter 15 except the capacitors 13 and 14, and the low-pass filter 15, the error voltage amplifier 2, together with the amplifier 17 and the pulse generator 19, may be included in a single substrate of IC. Furthermore, the loop gain of the control system may automatically be made constant with the small number of external parts attached to the IC.

As seen from the foregoing, the automatic gain control apparatus according to the invention may automatically make constant the loop gain of the control system including the servo system even when a plurality of the motor speeds to be set are employed. Therefore, there is no need for changing the circuit constants of the servo system every time a new motor speed is set, thereby to stably control the motor speed. Further, in case where the automatic gain control apparatus is fabricated into the IC circuit, the small number of external parts are necessary for the IC circuit fabricated.

We claim:

1. An automatic gain control apparatus comprising:
a frequency-voltage converter including a constant current source, a capacitor charged with the output current from said constant current source, means for discharging said capacitor in response to an input pulse signal having a period proportional to the rotational period of a motor, thereby to form a saw-tooth wave voltage at said capacitor, and means for sampling and holding the saw-tooth wave voltage so as to produce an output in the form of a DC voltage;
error voltage amplifier means for comparing said DC voltage from said frequency-voltage converter with a reference voltage and for producing an error voltage corresponding to the result of said comparison to said motor thereby to set the rotational speed of said motor;
means for varying the output current from said constant current source to set a plurality of desired motor speeds;
means for generating a signal proportional to the output current of said constant current source;
means for controlling the gain of said error voltage amplifier means in response to said proportional signal from said generating means, thereby to compensate for changes in the gain of said frequency-voltage converter produced when the motor speed is changed by said setting means.

2. An automatic gain control apparatus according to claim 1, wherein said generating means includes a second constant current source constituted by a current Miller circuit connected to said first-mentioned constant current source.

3. An automatic gain control apparatus according to claim 1, wherein said error voltage amplifier is a constant current type differential amplifier.

4. An automatic gain control apparatus according to claim 2, said error voltage amplifier means including a constant current type differential amplifier, and said compensating means including a connection circuit for supplying the output current of said second constant current source to said constant current type differential amplifier.

5. An automatic gain control apparatus according to claim 1, wherein said setting means includes switching means for reducing the number of revolutions of said motor, said compensating means including a connection circuit for reducing the gain of said error voltage amplifier means when the number of motor revolutions is reduced by said switching means.

6. An automatic gain control circuit according to claim 1, in which said error voltage amplifier means includes a plurality of electronic switches of which the operating voltage or operating current depends on the said signal proportional to the output current from said constant source and a constant current type differential amplifier connected to said electronic switches, the input signal of which is changed in accordance with the switching of said electronic switches.

7. An automatic gain control circuit according to claim 1, wherein said error voltage amplifier means includes a variable attenuator for changing an amount of attenuation by said signal proportional to the output current of said constant current source and a constant current differential amplifier connected to said variable attenuator.

8. An automatic gain control apparatus according to claim 1, wherein said setting means includes switching means for changing the motor speed to at least three steps of $\frac{1}{2}$, 1, and 2 times the motor speed, said generating means including means for generating three signals corresponding to the three steps in motor speed resulting from the change of the switching means, the gain of said error voltage amplifier means being controlled by said three signals in such a manner that the gain of said error voltage amplifier means becomes substantially half or twice when the motor speed is made half or twice, respectively, whereby a change in the gain of the motor control system produced with the change of the motor speed is substantially compensated.

* * * * *